United States Patent
Atsatt (10) Patent No.: US 9,729,518 B1
(45) Date of Patent: Aug. 8, 2017

(54) METHOD AND APPARATUS FOR SECURE PROVISIONING OF AN INTEGRATED CIRCUIT DEVICE

(71) Applicant: Altera Corporation, San Jose, CA (US)

(72) Inventor: Sean R. Atsatt, Santa Cruz, CA (US)

(73) Assignee: Altera Corporation, San Jose, CA (US)

(*) Notice: Subject to any disclaimer, the term of this patent is extended or adjusted under 35 U.S.C. 154(b) by 136 days.

(21) Appl. No.: 14/255,451

(22) Filed: Apr. 17, 2014

(51) Int. Cl.
*H04L 29/06* (2006.01)
*G11C 17/16* (2006.01)

(52) U.S. Cl.
CPC .......... *H04L 63/0428* (2013.01); *G11C 17/16* (2013.01)

(58) Field of Classification Search
CPC ... H04L 63/061; H04L 9/0816; G06F 21/606; G06F 21/72
See application file for complete search history.

(56) References Cited

U.S. PATENT DOCUMENTS

| | | | |
|---|---|---|---|
| 6,628,786 B1 | 9/2003 | Dole | |
| 7,039,192 B1 | 5/2006 | Whelan | |
| 7,328,342 B2 | 2/2008 | Albanese et al. | |
| 7,502,466 B2 | 3/2009 | Shahindoust et al. | |
| 8,429,408 B2 | 4/2013 | Vanstone | |
| 2006/0072762 A1* | 4/2006 | Buer | G06F 21/72 380/277 |
| 2012/0102334 A1* | 4/2012 | O'Loughlin | G06F 21/57 713/189 |
| 2014/0140509 A1* | 5/2014 | Chastain | G06F 21/6227 380/270 |

* cited by examiner

*Primary Examiner* — Izunna Okeke
(74) *Attorney, Agent, or Firm* — Vineet Dixit; Jason Tsai (57) ABSTRACT

A method of operating an integrated circuit may include generating a session key with a random number generator circuit. The session key may then be used to establish a secure communications channel between the integrated circuit and a remote server. The integrated circuit may be placed in a non-operational mode prior to establishing the secure communications channel. Accordingly, in response to establishing the secure communications channel, the integrated circuit may be placed in an operational mode to allow user operation. In some scenarios, the integrated circuit may receive license files from the remote server to enable implementation of specific logic blocks on the integrated circuit via the established secure communications channel.

20 Claims, 8 Drawing Sheets

FIG. 7B

METHOD AND APPARATUS FOR SECURE PROVISIONING OF AN INTEGRATED CIRCUIT DEVICE

BACKGROUND

Integrated circuits may include circuitry that may be adapted to perform a variety of functions. Typically, a single die may be sold in many different configurations. As an example, different circuit blocks in a die may be enabled or disabled, depending on pricing and user needs. As such, different dies with different configurations may be sold at different cost points.

Generally, to keep track of different circuit blocks that are enabled in a single device, a unique identifier may be assigned to each enabled circuit block. The unique identifier may be a stock keeping unit (SKU) number. As such, there may be multiple SKU numbers associated with a single device, depending on the number of circuit blocks or features enabled in the device.

As devices may be distributed and shipped to different places, an inventory for all these devices may be held at multiple locations (e.g., at the vendor location, at the distributor, at the customer distribution center, etc.). It may be challenging to keep track of multiple SKU numbers for each device in every inventory.

Often, when a device is shipped from one party to another (e.g., when the device is being sold from a vendor to a customer), the device may need to be able to establish a secure communications channel between the two parties. As an example, a vendor may need to remotely enable certain circuit blocks in the device to provide new services to a customer.

Additionally, programmable devices, such as field programmable gate array (FPGA) devices, are general purpose devices that may be configured to perform different functions depending on different user requirements. For example, such devices may be configurable to include intellectual property (IP) blocks (i.e., licensed logic blocks that may be reused). Oftentimes, specific IP blocks that are required by the user or customer may only be known after a device has been provisioned (or after the device has been sold and shipped to the customer).

Having the ability to establish a secure communications channel with an integrated circuit device enables the device to be remotely provisioned without having to store multiple SKUs for a single device at every inventory location. Specific features in the device (e.g., IP blocks required in a user application, etc.) may also be remotely enabled or disabled at a later time.

SUMMARY

Techniques for establishing a secure communications channel to remotely provision an integrated circuit (e.g., by enabling specific circuit blocks in the integrated circuit or by placing the integrated circuit in an operational mode) are disclosed. Embodiments of the present invention include methods to activate an integrated circuit remotely or decrypt encrypted circuit blocks in an integrated circuit design.

It is appreciated that the present invention can be implemented in numerous ways, such as a process, an apparatus, a system, a device or a computer readable medium. Several inventive embodiments of the present invention are described below.

A method of operating an integrated circuit includes generating a session key with a random number generator circuit on the integrated circuit. The method further includes establishing a secure communications channel with a remote server using the session key. The secure communications channel may be established by a processor circuit on the integrated circuit. In response to establishing the secure communications channel with the remote server, the integrated circuit may be placed in an operational mode. In one scenario, the integrated circuit may be placed in a non-operational mode prior to establishing the secure communications channel with the remote server. In one embodiment, an asymmetric encryption scheme may be used to establish the secure communications channel between the integrated circuit and the remote server. The remote server may accordingly provision the integrated circuit via the secure communications channel.

In some scenarios, a programmable integrated circuit such as a field-programmable gate array (FPGA) device may have an encrypted configuration file. A method of operating such an integrated circuit may include receiving an encrypted license file from a remote server and decrypting the encrypted license file with decrypter circuitry on the integrated circuit. The encrypted license file may be decrypted using a private key stored in the integrated circuit device. The decrypted license file may contain another private key that may be used to decrypt the integrated circuit's encrypted configuration file. The decrypted configuration file may accordingly be used to configure the integrated circuit. In one scenario, the decrypted configuration file contains intellectual property (IP) blocks that may be implemented on the integrated circuit.

A method of securely provisioning an integrated circuit with a remote server includes receiving an encrypted session key from the integrated circuit. The encrypted session key is decrypted using a private key associated with the integrated circuit to obtain a decrypted session key. In one scenario, the remote server may further receive a signed session key from the integrated circuit. The signed session key may be decrypted with a public key associated with the integrated circuit. The decrypted session key may then be validated with the decrypted signed session key (e.g., by comparing the hash value of the decrypted session key with the decrypted signed session key) to ascertain the identity of the integrated circuit in order to establish a secure communications channel with the integrated circuit. After the secure communications channel is established, the remote server may provision the integrated circuit and the integrated circuit may be placed in an operational mode.

A system for establishing a secure remote communications channel with an integrated circuit includes a database module and a decrypter. The database module stores a list of device identifiers with their matching private keys. The decrypter is adapted to decrypt an encrypted session key received from the integrated circuit based on a matching private key retrieved from the database module. The matching private key may be retrieved using a device identifier received from the integrated circuit. The decrypted session key may thus be used to establish a secure remote communications with the integrated circuit.

DETAILED DESCRIPTION

The embodiments provided herein include circuits and techniques to provision an integrated circuit remotely via a secure communications channel.

It will be obvious, however, to one skilled in the art, that the present exemplary embodiments may be practiced without some or all of these specific details. In other instances, well-known operations have not been described in detail in order not to unnecessarily obscure the present embodiments.

Figure 1:
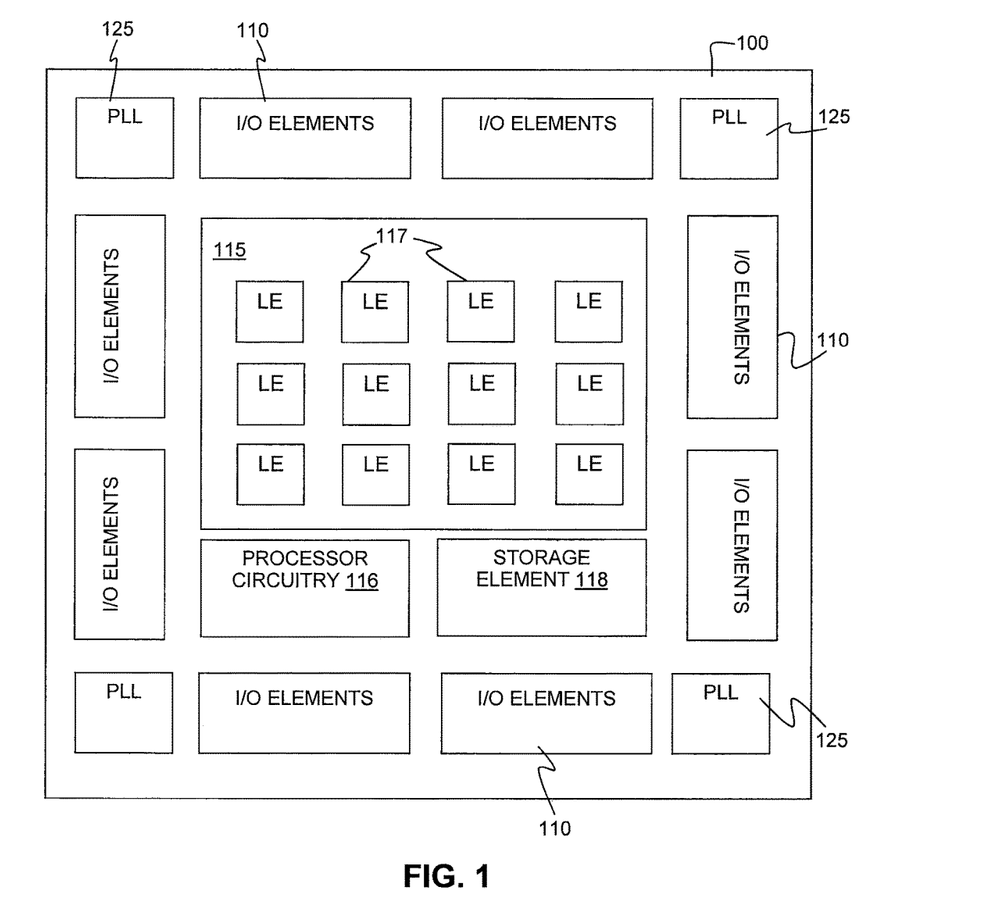
FIG. 1 is an illustrative block diagram of an integrated circuit in accordance with one embodiment of the present invention.

An integrated circuit (IC) device such as a field-programmable gate array (FPGA) device or an application specific integrated circuit (ASIC) device, generally includes, among others, memory modules, logic blocks, clock generation circuitry, and input-output elements. FIG. 1, meant to be illustrative and not limiting, shows a simplified block diagram of IC 100. IC 100 includes core logic region 115 and input-output elements 110. It should be appreciated that a single device such as IC 100 can potentially support a variety of different interfaces and each individual input-output bank 110 may support a different input-output standard with a different interface or protocol (e.g., high-speed serial interface protocol).

Signals received from external circuitry at input-output elements 110 may be routed from input-output elements 110 to core logic region 115, PLLs 125 or other logic blocks (not shown) on IC 100. Core logic region 115 (or more specifically, logic elements (LEs) 117) may perform functions based on the signals received. Accordingly, signals may be sent from core logic region 115 and other relevant logic blocks of IC 100 to other external circuitry or components that may be connected to IC 100 through input-output elements 110.

As shown in the embodiment of FIG. 1, core logic region 115 may be populated with logic cells that may include LEs 117 or core registers, among other circuits. The LEs may further include look-up table-based logic regions and may be grouped into "Logic Array Blocks" (LABs). The LEs and groups of LEs or LABs can be configured to perform logical functions desired by a user or circuit designer.

Other circuits, such as phase-locked loops (PLLs) 125, for clock generation and timing, may also be located outside core logic region 115 (e.g., at corners of IC 100 or adjacent to input-output elements 110). Clock signals are generally used in IC devices to synchronize different circuit elements in the device. Accordingly, IC 100 may include a clock network (not shown) that is used to transmit clock signals from clock circuits (e.g., PLLs 125) to various parts of IC 100.

Generally, a single IC device may be sold in various configurations as different circuit blocks may be enabled or disabled in any one device. As an example, additional features on a device may need to be enabled remotely (e.g., when a user requests for an update, or when a user obtains authorization to have additional features enabled on a device). As another example, a vendor may want to provision a device after the device has been shipped to a customer. As such, an IC device may require an authentication scheme for it to communicate securely with a remote server so that the IC device may be provisioned remotely and additional features may be enabled as needed.

In the embodiment of FIG. 1, IC 100 may further include processor circuitry 116 and storage element 118. Processor circuitry 116 may be used to establish a secure communications channel with a remote server. In one scenario, storage element 118 may store different private and public keys and a combination of symmetric and asymmetric encryption schemes may be used to establish the secure communications channel using the stored private and public keys.

Figure 2:
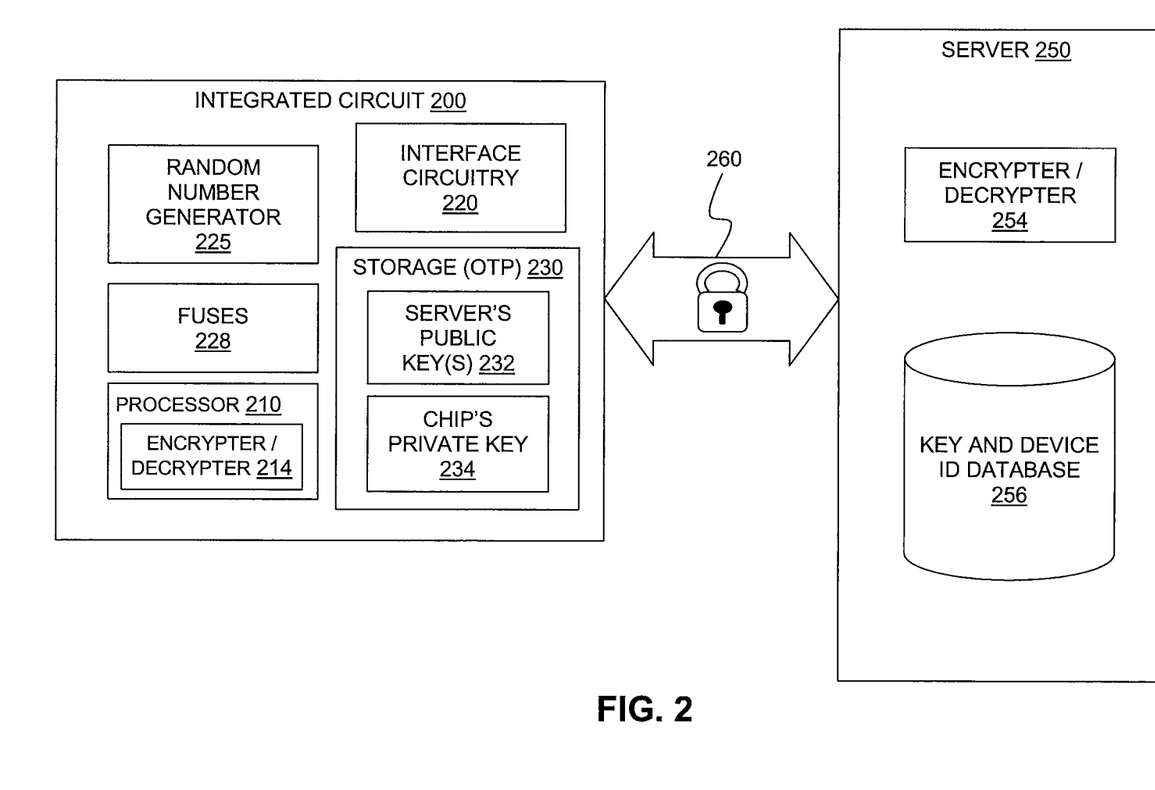
FIG. 2 shows an illustrative integrated circuit device communicating with a server via a secure communications channel in accordance with one embodiment of the present invention.

FIG. 2 shows illustrative IC device 200 communicating with server 250 via secure communications channel 260 in accordance with one embodiment of the present invention. It should be noted that server 250 and IC device 200 may be located at different locations. For example, server 250 may be located at a vendor's factory and IC device 200 may be located at a customer's distribution center.

In the embodiment of FIG. 2, IC device 200 includes processor 210 (processor 210 may include encrypter/decrypter 214), interface circuitry 220, random number generator 225, fuses 228, and storage circuitry 230 in which public key 232 and private key 234 are stored, while server 250 includes encrypter/decrypter circuit 254, and key and device identification (ID) database 256. IC device 200 may communicate with server 250 via secure communications channel 260 via interface circuitry 220. As an example, interface circuitry 220 may include an Ethernet, a Peripheral Component Interconnect Express (PCIe) or a Joint Test Action Group (JTAG) communication protocol circuit.

In the embodiment of FIG. 2, to establish secure communications channel 260 between IC device 200 and server 250, an asymmetric key encryption technique may be used. An IC device such as IC device 200 may be assigned a device identifier (ID) (e.g., the device ID may be a unique string of numbers or characters that is associated with IC device 200). In the scenario that server 250 is a server that holds an inventory at a vendor distribution center, each device sold or shipped may thus have a private key (e.g., a 256-bit unique random number) and a matching public key associated with its unique ID. As such, key and device ID database 256 may include a list of all the private and public keys associated with the respective IC devices in the inventory.

Each IC device may accordingly store its own private key and a set of the server's public keys. In the embodiment of FIG. 2, IC device 200 stores its personal private key 234 and the server's public keys 232 in storage circuitry 230. In one embodiment, storage circuitry 230 may include one-time-programmable (OTP) fuses.

The respective encrypter/decrypter circuits 214 and 254 in IC device 200 and server 250 may encrypt and decrypt messages (with their respective private/public keys) that are being transmitted through secure communications channel 260. Random number generator 225 in IC device 200 may be used to generate session keys for secure communications channel 260. Specific details on how secure communications channel 260 may be established will be described later with reference to FIG. 3.

Once secure communications channel 260 is established, server 250 may send configuration instructions to provision IC device 200. In one instance, server 250 (e.g., a vendor) may send configuration instructions that enable certain features in IC device 200 based on customer requirements (or as part of an update operation to update certain logic blocks in the IC device). In another instance, server 250 may enable IC device 200 and place it in a user mode (e.g., a normal operational mode) after having established a secure remote communication channel 260 with IC device 200. In one embodiment, in response to receiving a configuration instruction from server 250, IC device 200 may blow a selected fuse from the set of fuses 228 to indicate that IC device 200 has been successfully provisioned. It should be noted that fuses 228 may be used to place IC device 200 in different modes once the IC device has been provisioned (enabled or placed in user operational mode).

Figure 3:
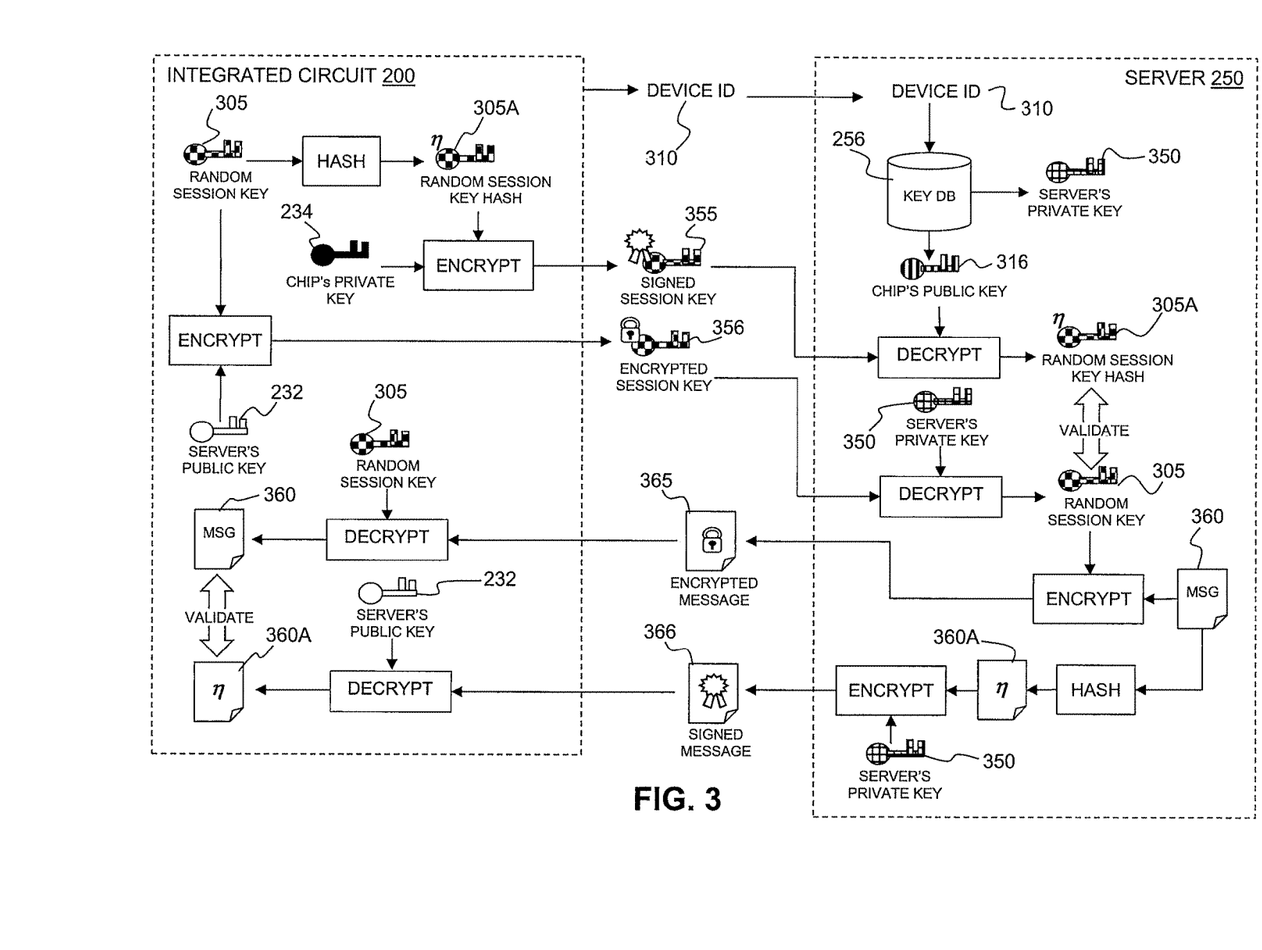
FIG. 3 depicts respective steps performed by an integrated circuit device and a server in order to establish a secure communications channel in accordance with one embodiment of the present invention.

FIG. 3 depicts the respective steps performed by IC device 200 and server 250 in order to establish a secure communications channel in accordance with one embodiment of the present invention. It should be noted that the steps described herein may refer to an asymmetric encryption system where private and public keys are used to decrypt and encrypt messages sent between IC device 200 and server 250.

In one embodiment, to establish a secure communications channel as that shown in FIG. 2, server 250 needs to perform a device authentication operation while IC device 200 needs to perform a server authentication operation. This ensures that both server 250 and IC device 200 are communicating with each other and not with an unknown device. In order to establish a secure communications channel, IC device 200 may begin by generating a random session key 305 with a random number generator circuit (e.g., random number generator 225 shown in FIG. 2). Random session key 305 is signed by IC device 200 by calculating the hash of random session key to obtain random session key hash 305A before encrypting random session key hash 305A with the chip's private key 234. It should be noted that different hash functions may be used to generate a hash value and as thus. Specific hash functions that may be applied are not described in detail herein in order to not unnecessarily obscure the present invention.

Signed session key 355 is transmitted from IC device 200 to server 250. In the embodiment of FIG. 3, an encrypted session key 356 is transmitted together with signed session key 355. Encrypted session key is generated by encrypting random session key 305 with the server's public key 232 that is stored in IC device 200. As mentioned above with reference to FIG. 2, IC device 200 may be assigned a unique device ID. In one scenario, the device ID 310 is transmitted to server 250 together with signed session key 355 and encrypted session key 356.

Once server 250 receives a request from IC device 200, server 250 may need to perform a device authentication operation. For server 250 to perform the device authentication operation, server 250 needs to validate the identity of IC device 200. In order to do this, server 250 may first look up its own private and public keys that are associated with IC device 200 in key database 256 using device ID 310. As shown in FIG. 2, server's private key 350 and chip's public key 316 may be retrieved from key database 256 based on the received device ID 310.

After retrieving the respective private and public keys from key database 256, server 250 may use the keys to authenticate or validate the identity of IC device 200. In one scenario, server 250 may first decrypt signed session key 355 with chip's public key 316 to obtain the decrypted random session key hash 305A. Then, server 250 may decrypt the received encrypted session key 356 using server's private key 350 to obtain the decrypted random session key 305. Server 250 may accordingly validate the identity of IC device 200 by comparing and validating the result of the hash value of random session key 305 with the decrypted random session key hash 305A. If the values match, then IC device 200 is a known device and server 250 may provision or enable circuitry in IC device 200 accordingly.

On the IC device 200 side, when IC device 200 receives a response or command from server 250, IC device 200 may need to validate the identity of server 250 before performing further operations. As shown in FIG. 3, server 350 may send a command or message 360 to IC device 200. Message 360 may be encrypted using the random session key 305 that server 250 had received from IC device 200 to obtain encrypted message 365. The same message 360 may further be signed by server 250. As shown in FIG. 3, server 250 signs message 360 by generating message hash 360A and encrypting message hash 360A with the server's private key 350 that is associated with IC device 200 (retrieved from key database 256 based on device ID 310). Signed message 366, together with encrypted message 365, is transmitted from server 250 to IC device 200.

To perform server authentication, IC device 200 may first decrypt encrypted message 365 with random session key 305 (i.e., the random key that is generated for that particular session) to obtain decrypted message 360. Accordingly, IC device may decrypt signed message 366 that it received from server 250 with the server's public key 232 to obtain the decrypted message hash 360A. IC device 200 may validate the identity of server 250 by comparing and validating the result of the hash value of decrypted message 360 with the decrypted message hash 360A. If the hash of message 360 calculated by IC device 200 matches decrypted message hash 360A, then IC device 200 may determine that the received message or command originates from an authentic source (in this case, server 250) and is thus a valid command.

After a full authentication has been performed, a secure communications channel between both IC device 200 and server 250 may be established. In one scenario, prior to establishing the secure communications channel with server 250, IC device 200 may be placed in a non-operational mode (e.g., IC device 200 may not be provisioned and may only operate to connect to server 250 via a secure communications channel). Once the secure communications channel 260 (as shown in FIG. 2) has been established, IC device 200 may be provisioned by server 250 and may execute commands received from server 250. As an example, the received command may include startup code that is used to place IC device 200 in operational mode. In one embodiment, once IC device 200 has been provisioned and placed in an operational mode (e.g., user mode), the operating IC device may further receive license files from server 250. The license files may be used to decrypt encrypted logic blocks that may then be implemented on IC device 200 (as described in later paragraphs with reference to FIGS. 5, 6, 7A and 7B).

Figure 4:
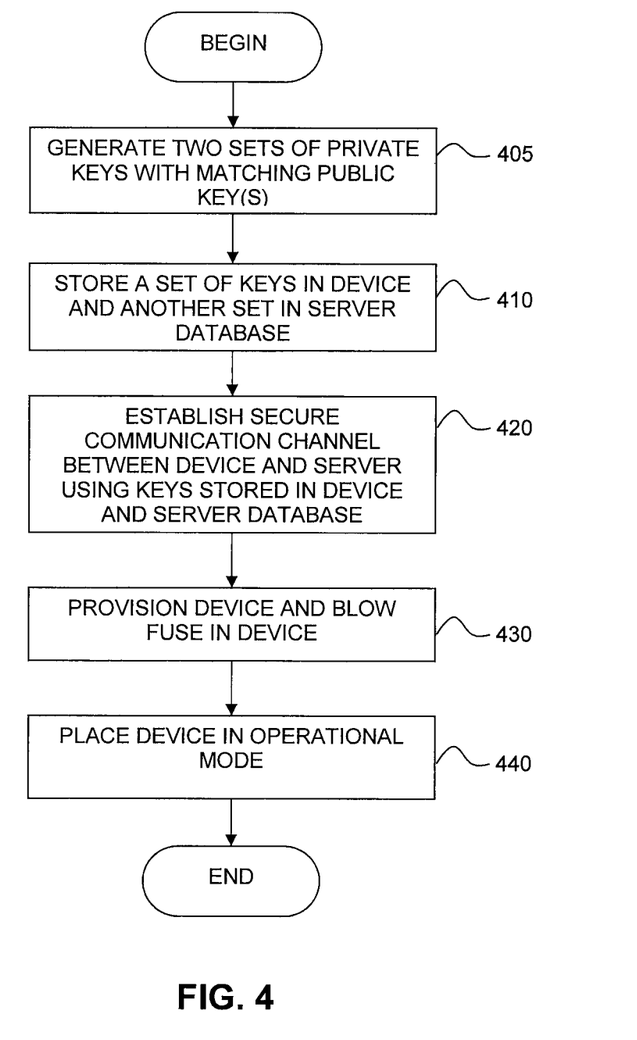
FIG. 4 depicts illustrative steps to provision an integrated circuit device in accordance with one embodiment of the present invention.

FIG. 4 depicts illustrative steps to provision an IC device with a remote server in accordance with one embodiment of the present invention. At step 405, two sets of private keys with matching public keys are generated. In one instance, the sets of keys may be generated by the vendor before the IC device is sold or shipped to a customer. At step 410, a set of keys is stored in the IC device while another set is store in a database. As shown in FIG. 2, the server's public key 232 and the chip's private key 234 are stored in IC device 200 while the chip's public key and the server's private key that is associated with the IC device may be stored in key and device ID database 256. The server's public key stored in the IC device may be used to encrypt messages (e.g., a random session key) being transmitted from the IC device and may be used to decrypt messages (e.g., command or responses) received from the server.

At step 420, a secure communications channel between the IC device and the remote server is established using the respective sets of public and private keys stored in the IC device and the server database. In one scenario, as explained above with reference to FIG. 3, the IC device may transmit an encrypted random session key together with a signed random session key to the remote server to establish communication. The remote server may accordingly verify the identity of the IC device using the signed random session key and the encrypted session key.

At step 430, after the secure communications channel has been established, the server may transmit configuration instructions to provision the IC device. The IC device may accordingly use the random session key generated for that particular session, together with the server's public key, to validate the instructions received from the server. After the configuration instructions are received and validated (i.e., verified that the configuration instructions came from an authentic source), the IC may blow a selected fuse to indicate that the IC device has been successfully provisioned.

As shown in the embodiment of FIG. 2, IC device 200 includes fuses 228 that may be used as state fuses to indicate the different states of the IC device at any one time. In one embodiment, prior to being provisioned, an IC device may be disabled (e.g., placed in a non-operational mode). After establishing a secure communications channel, a vendor (or any other party that controls the IC device) may enable the IC device. Accordingly, a specific fuse in the IC device may be blown to indicate that the IC has been successfully provisioned and enabled. At step 440, the IC device is placed in an operational mode (e.g., a user mode) when enabled. At this stage, a user (e.g., a design engineer) may configure the IC device as desired.

Figure 5:
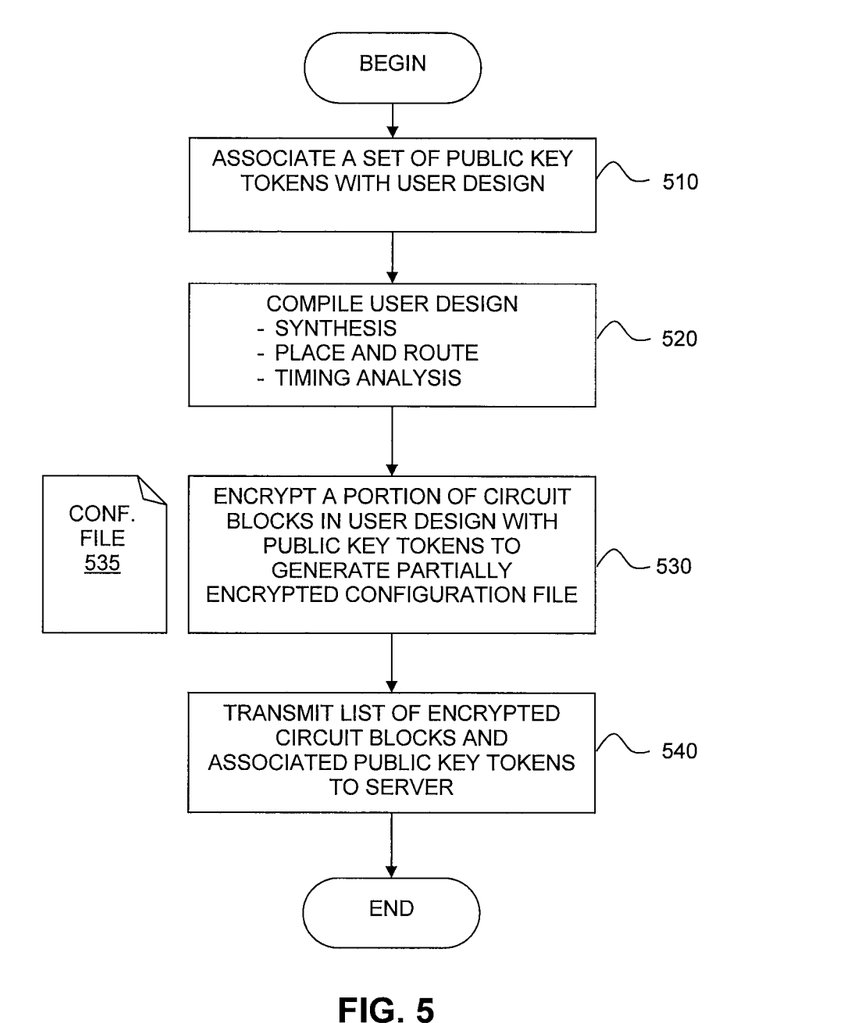
FIG. 5 shows an illustrative method for designing an integrated circuit with an electronic design automation (EDA) tool in accordance with one embodiment of the present invention.

FIG. 5 shows illustrative steps for designing an IC with an electronic design automation (EDA) tool in accordance with one embodiment of the present invention. At step 510, a set of public key tokens is associated with a user design. As an example, a customer (e.g., a user or design engineer) who has obtained a set of public key tokens from the vendor may design a circuit for a targeted IC device using an EDA tool. The user design may be compiled at step 520. In one embodiment, the compilation process may include various steps such as, among others, synthesis, place and route, and timing analysis. It should be noted that specific details of the compilation process are not described in order to not obscure the present invention.

Generally, after compilation, an EDA tool may generate a configuration file that the user may then use to configure or program the targeted IC device. In some instances, the generated configuration file (or at least a portion of it) may be encrypted. As shown in FIG. 5, at step 530, a portion of the circuit blocks in the user design is encrypted with the public key tokens to generate a partially encrypted configuration file 535. In one embodiment, the encrypted circuit blocks include reusable logic cells of different sizes and complexity that perform specific functions, such as, digital signal processing (DSP) units, protocol interfaces, etc. These readily available functional blocks may also be commonly referred to as intellectual property (IP) cores.

As is generally known, instead of designing every functional block needed in a design, a user may choose to license IP cores from a vendor. Accordingly, in one embodiment, the vendor may issue a set of public key tokens to the user. When the user creates a circuit design that requires specific IP cores, the EDA tool may then encrypt the IP cores to generate encrypted configuration file 535.

The encrypted circuit blocks in encrypted configuration file 535 may need to be decrypted when encrypted configuration file 535 is used to configure its targeted device. As such, the list of encrypted circuit blocks and their associated public key tokens are transmitted to a server (e.g., the vendor) at step 540. It should be noted the EDA tool may automatically generate the list of encrypted circuit blocks before sending the list to its vendor. Based on the public key tokens (and the device ID of the targeted IC device), the vendor then generates a license file that the user may use to decrypt the encrypted configuration file 535 when configuring the IC device.

Figure 6:
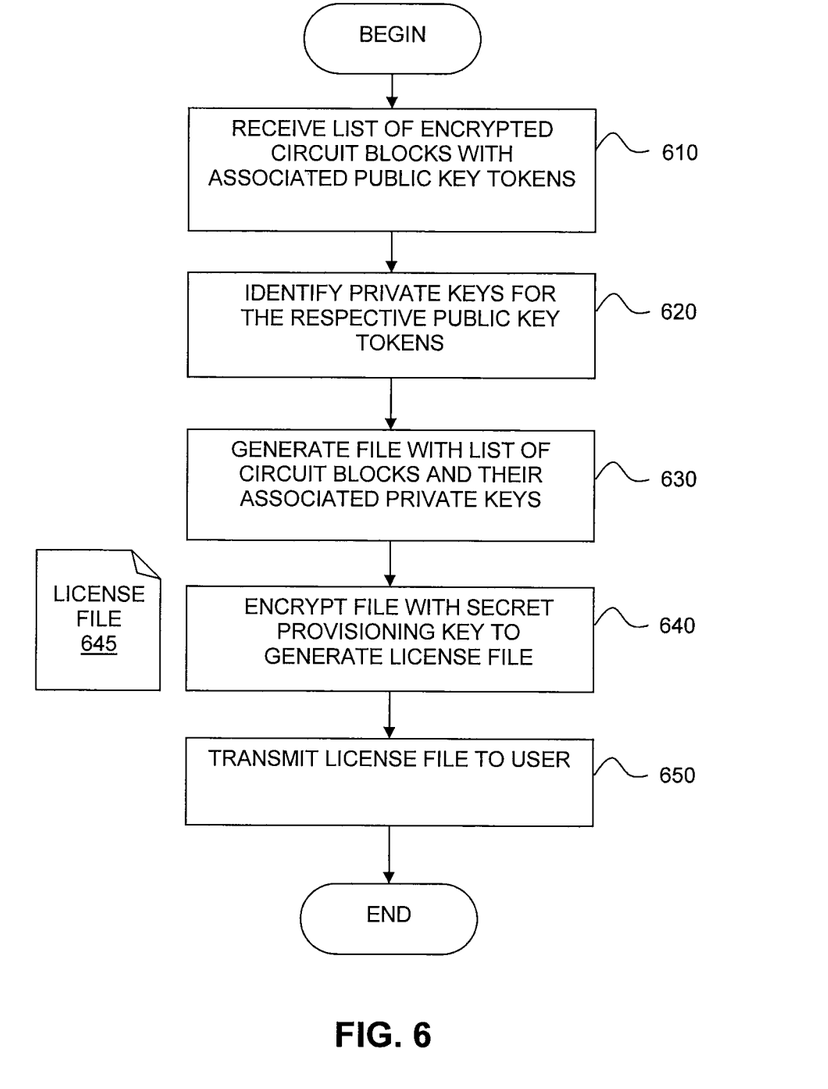
FIG. 6 shows illustrative steps for generating a license file based on a set of public key tokens in accordance with one embodiment of the present invention.

FIG. 6 shows illustrative steps for generating a license file based on a set of public key tokens in accordance with one embodiment of the present invention. As described above, after a partially encrypted configuration file 535 (as shown in FIG. 5) is generated, the list of encrypted circuit blocks with their associated public key tokens may be transmitted back to the vendor (or any party that is able to authenticate the encrypted circuit blocks). At step 610, the list of encrypted circuit blocks with their associated public key tokens is received at a server (e.g., server 250 of FIG. 2).

At step 620, the private keys for the respective public key tokens are identified. As an example, server 250 may retrieve the private keys from key database 256 as shown in FIG. 2. A file with the list of circuit blocks and their associated private keys is generated at step 630. The server may then encrypt the file with a secret provisioning key to generate license file 645 at step 640. In one embodiment, a vendor may generate a secret provisioning key for each IC device (e.g., chip's private key 234 shown in FIG. 2) before they are shipped to customers. The secret provisioning key that is associated with each IC device may be stored in a database. As such, in order to generate license file 645, the server may retrieve the secret provisioning key for that particular IC device from the database based on the ID of that IC device. The generated license file 645 is then transmitted to the user at step 650.

Figure 7A:
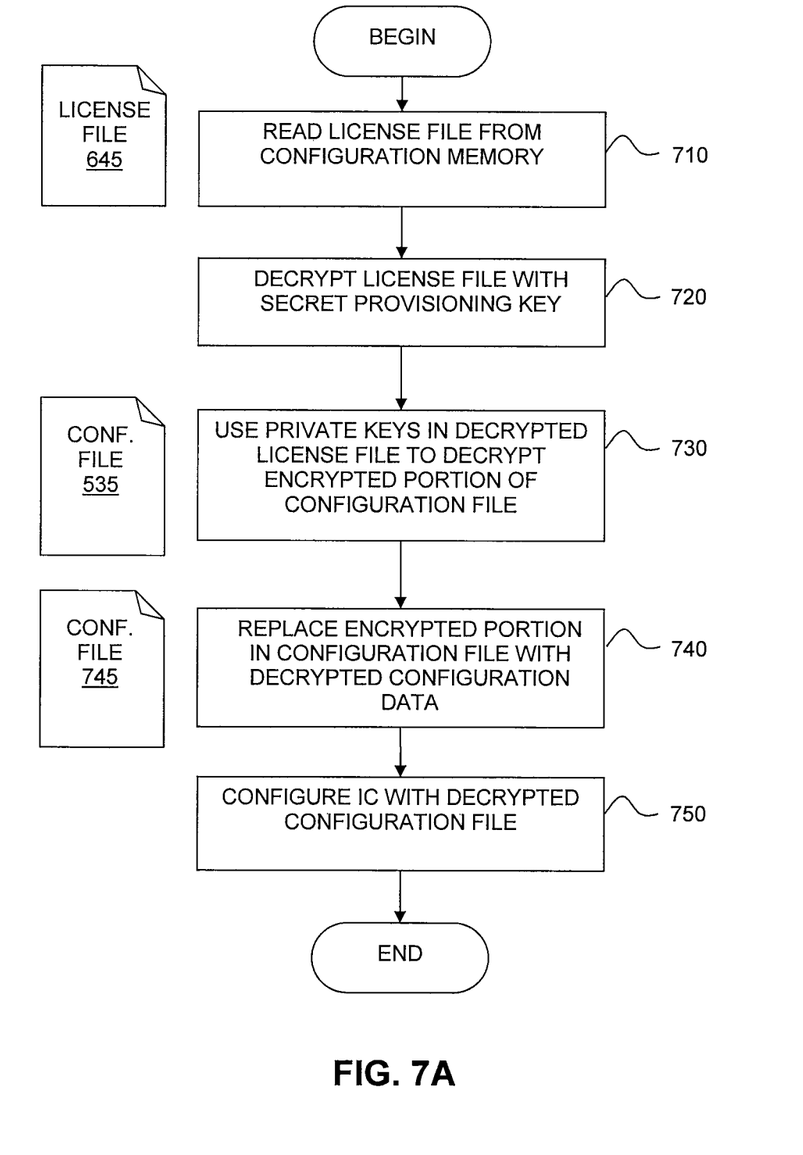
FIG. 7A shows illustrative steps for configuring an integrated circuit device with an encrypted configuration file in accordance with one embodiment of the present invention.

FIG. 7A shows illustrative steps for configuring an IC device with an encrypted configuration file in accordance with one embodiment of the present invention. At step 710, license file 645 is read from a configuration memory. In one embodiment, the configuration memory may be a memory controller or a flash programmer that is used to configure the IC device. During configuration, the IC device may read license file 645 from the flash programmer. The license file is decrypted with a secret provisioning key at step 720. In one instance, the secret provisioning key may be the chip's private key 234 shown in FIG. 2 that is used to establish a secure remote communications channel with server 250.

As mentioned earlier, configuration file 535 may contain encrypted circuit blocks that need to be decrypted before the user design contained in configuration file 535 can be loaded into the targeted IC device. Accordingly, after license file 645 has been decrypted, the private keys in the decrypted license file are used to decrypt the encrypted portion of configuration file 535 at step 730. The encrypted portion in configuration file 535 may thus be replaced with decrypted configuration data at step 740 to generate decrypted configuration file 745. The targeted IC device is then configured with decrypted configuration file 745 at step 750.

Figure 7B:
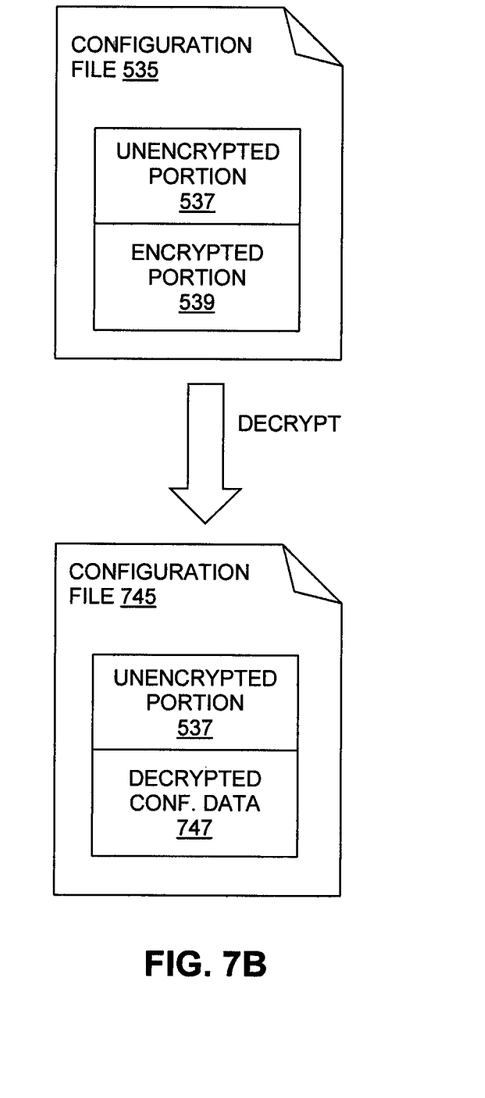
FIG. 7B shows an illustrative encrypted configuration file and a resulting decrypted configuration file in accordance with one embodiment of the present invention.

FIG. 7B shows illustrative encrypted configuration file 535 and decrypted configuration file 745 in accordance with one embodiment of the present invention. As described above, encrypted configuration file 535 may include unencrypted portion 537 and encrypted portion 539. For example, encrypted portion 539 may include IP cores or readily available functional blocks that a user chooses to include in their design while unencrypted portion 537 may include the user's own circuit design.

When encrypted configuration file 535 is decrypted, its encrypted portion 539 may be replaced with decrypted configuration data 747 to generate decrypted configuration file 745. In the embodiment of FIG. 7A, this is performed at steps 730 and 740 when private keys in license file 645 are used to decrypt encrypted portion 537 in encrypted configuration file 535 to obtain decrypted configuration file 745. It should be noted that even though encrypted portion 539 is shown as a single continuous block, in an actual configuration file, encrypted configuration data may exist in different locations. In one embodiment, encrypted configuration file 535 may include special markers or pointers to indicate where encrypted contents are located in the configuration file. Accordingly, based on the positions of the markers, encrypted parts in a configuration file may be located and replaced with decrypted configuration data.

The embodiments, thus far, were described with respect to programmable logic circuits. The method and apparatus described herein may be incorporated into any suitable circuit. For example, the method and apparatus may also be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method of operating an integrated circuit, the method comprising:
    with a random number generator circuit, generating a session key;
    with processing circuitry, establishing a secure communications channel between the integrated circuit and a remote server using the session key, wherein establishing the secure communications channel comprises encrypting the session key, decrypting a message from the remote server using the session key, and authenticating the decrypted message from the remote server; and
    with the processing circuitry, placing the integrated circuit in an operational mode in response to establishing the secure communications channel.

2. The method defined in claim 1, wherein the integrated circuit is placed in a non-operational mode prior to establishing the secure communications channel.

3. The method defined in claim 1, wherein the integrated circuit comprises a plurality of fuses, and wherein placing the integrated circuit in the operational mode comprises:
    blowing at least one fuse of the plurality of fuses.

4. The method defined in claim 1, wherein the integrated circuit comprises a storage element that stores a private key, and wherein using the session key to establish the secure communications channel comprises:
    with the processing circuitry, signing the session key with the private key;
    with encryption circuitry on the integrated circuit, encrypting the session key with a matching public key to obtain an encrypted signed session key; and
    transmitting the encrypted signed session key to the remote server.

5. The method defined in claim 4 further comprising:
    enabling circuitry on the integrated circuit based on the private key after placing the integrated circuit in the operational mode.

6. The method defined in claim 5, wherein the integrated circuit comprises a programmable logic device, and wherein enabling circuitry on the integrated circuit based on the private key comprises:
    transmitting an encrypted configuration file having at least one encrypted circuit block to the remote server; and
    receiving a license file that is associated with the encrypted configuration file from the remote server.

7. The method defined in claim 6, wherein the license file comprises an encrypted license file, the method further comprising:
   with decryption circuitry, decrypting the encrypted license file with the private key to obtain at least one additional private key; and
   with the decryption circuitry, using the at least one additional private key to decrypt the encrypted configuration file to obtain a decrypted configuration file.

8. A method of operating an integrated circuit having associated encrypted configuration data, the method comprising:
   receiving an encrypted license file from a remote server;
   with decrypter circuitry on the integrated circuit, decrypting the encrypted license file using a private key stored in the integrated circuit to obtain at least one additional private key; and
   decrypting the encrypted configuration data using the at least one additional private key to obtain decrypted configuration data for the integrated circuit.

9. The method defined in claim 8, wherein the integrated circuit comprises a programmable logic device that is placed in a non-operational mode, the method further comprising:
   placing the integrated circuit in an operational mode prior to receiving the encrypted license file from the remote server.

10. The method defined in claim 9, wherein placing the integrated circuit in the operational mode comprises:
   with a random number generator circuit in the integrated circuit, generating a session key;
   using the session key to establish a secure communications channel between the integrated circuit and the remote server; and
   in response to establishing the secure communications channel, placing the integrated circuit in the operational mode.

11. The method defined in claim 9, wherein the integrated circuit comprises a plurality of fuses, the method further comprising:
   blowing at least one fuse of the plurality of uses on the integrated circuit, wherein the integrated circuit is placed in the operational mode in response to blowing the at least one fuse.

12. A method of securely provisioning an integrated circuit with a remote server, the method comprising:
   receiving an encrypted session key from the integrated circuit;
   decrypting the encrypted session key using a private key associated with the integrated circuit to obtain a decrypted session key;
   encrypting a message using the decrypted session key;
   transmitting the encrypted message to the integrated circuit; and
   in response to obtaining the decrypted session key, establishing a secure communications channel with the integrated circuit to place the integrated circuit in an operational mode.

13. The method defined in claim 12 further comprising:
   receiving a configuration file having a list of encrypted circuit blocks associated with the integrated circuit;
   identifying at least one additional private key for the list of encrypted circuit blocks;
   generating a license file that contains the list of encrypted circuit blocks and the at least one additional private key; and
   transmitting the license file to the integrated circuit via the secure communications channel.

14. The method defined in claim 13 further comprising:
   encrypting the license file with the private key associated with the integrated circuit prior to transmitting the license file to the integrated circuit.

15. The method defined in claim 12 further comprising:
   receiving a device identifier from the integrated circuit; and
   retrieving the private key associated with the integrated circuit from a database based on the device identifier.

16. The method defined in claim 12, wherein establishing the secure communications channel with the integrated circuit to place the integrated circuit in the operational mode comprises:
   encrypting a response using the decrypted session key to generate an encrypted response to the integrated circuit;
   signing the encrypted response using an additional private associated with the remote server to obtain a signed encrypted response; and
   transmitting the signed encrypted response to the integrated circuit.

17. A system for establishing a secure remote communications channel with an integrated circuit having a device identifier comprising:
   a database module comprising a plurality of device identifiers and respective matching private keys associated with the plurality of device identifiers; and
   a decrypter that decrypts an encrypted session key from the integrated circuit based on a matching private key retrieved from the database module based on the device identifier to obtain a decrypted session key, wherein the secure remote communication channels is established based at least in part on the decrypted session key.

18. The system defined in claim 17, wherein the database module further comprises matching public keys for the plurality of device identifiers.

19. The system defined in claim 18 further comprising:
   an encrypter adapted to encrypt a signed version of the decrypted session key using a matching public key retrieved from the database module based on the device identifier to obtain an encrypted signed session key.

20. The system defined in claim 17, wherein the integrated circuit is in a first operational mode prior to establishing the secure remote communications channel, and wherein the integrated circuit is in a second operational mode that is different than the first operational mode after the secure remote communication channels is established.

* * * * *